US010470052B2

(12) United States Patent
Jen et al.

(10) Patent No.: US 10,470,052 B2
(45) Date of Patent: Nov. 5, 2019

(54) SYSTEMS AND METHODS FOR CONFIGURING RADIO COMMUNICATION DEVICES

(71) Applicant: Common Networks, Inc., San Francisco, CA (US)

(72) Inventors: Mark Jen, San Francisco, CA (US); Zachary Brock, San Francisco, CA (US); Grace Chen, San Francisco, CA (US); Jessica Shalek, San Francisco, CA (US); Amrik Kochhar, San Francisco, CA (US); Ralston Clarke, San Francisco, CA (US)

(73) Assignee: COMMON NETWORKS, INC., San Francisco, CA (US)

( * ) Notice: Subject to any disclaimer, the term of this patent is extended or adjusted under 35 U.S.C. 154(b) by 0 days.

(21) Appl. No.: 16/189,842

(22) Filed: Nov. 13, 2018

(65) Prior Publication Data
US 2019/0150001 A1    May 16, 2019

Related U.S. Application Data

(60) Provisional application No. 62/585,200, filed on Nov. 13, 2017.

(51) Int. Cl.
*H04W 16/18*       (2009.01)
*H04L 12/24*       (2006.01)
(Continued)

(52) U.S. Cl.
CPC .......... *H04W 16/18* (2013.01); *H04B 17/101* (2015.01); *H04L 41/0806* (2013.01); *H04L 41/0886* (2013.01); *H04L 43/16* (2013.01)

(58) Field of Classification Search
CPC ..... H04W 16/18; H04W 88/08; H04W 84/12; H04W 24/00; H04L 43/16; H04L 41/0806;
(Continued)

(56) References Cited

U.S. PATENT DOCUMENTS 5,940,372 A     8/1999  Bertin et al.
6,505,045 B1 *  1/2003  Hills ..................... H04W 16/18
                                                        455/422.1
(Continued)

FOREIGN PATENT DOCUMENTS

CN     102523162 B    2/2015
WO     2016111837     7/2016
(Continued)

OTHER PUBLICATIONS

"International Search Report and Written Opinion of the ISA, dated Mar. 15, 2019, for application No. PCT/US19/60824."

*Primary Examiner* — Marcus Hammonds
(74) *Attorney, Agent, or Firm* — Fernando & Partners, LLP

(57) ABSTRACT

A system for network communication, preferably including: a plurality of nodes, a central routing server, a plurality of routers, a plurality of antennae, and/or one or more Internet sources. A method for configuring radio communication devices, preferably including: determining an installation region, determining candidate radio cluster locations, evaluating candidate radio cluster locations, and/or determining information associated with radio installation.

12 Claims, 7 Drawing Sheets

(51) Int. Cl.
*H04B 17/10* (2015.01)
*H04L 12/26* (2006.01)

(58) Field of Classification Search
CPC ..... H04L 41/0886; H04B 17/101; G01S 5/00; G01S 5/02
See application file for complete search history.

(56) References Cited

U.S. PATENT DOCUMENTS

| | | | |
|---|---|---|---|
| 6,604,146 B1 | 8/2003 | Rempe et al. | |
| 6,711,148 B1* | 3/2004 | Hills | H04L 41/0823 370/338 |
| 6,956,527 B2* | 10/2005 | Rogers | G01S 5/02 342/458 |
| 7,430,189 B2* | 9/2008 | Bejerano | H04W 16/00 370/332 |
| 7,925,266 B1* | 4/2011 | Tran | H04W 16/18 455/423 |
| 9,781,608 B2* | 10/2017 | Dore | H04W 16/20 |
| 2003/0156549 A1 | 8/2003 | Binder et al. | |
| 2004/0143428 A1 | 7/2004 | Rappaport et al. | |
| 2009/0252134 A1* | 10/2009 | Schlicht | H04L 1/0015 370/338 |
| 2009/0285124 A1 | 11/2009 | Aguirre et al. | |
| 2012/0307663 A1 | 12/2012 | Kwak | |
| 2014/0160925 A1 | 6/2014 | Xu et al. | |
| 2014/0185454 A1 | 7/2014 | Bellur et al. | |
| 2014/0355476 A1 | 12/2014 | Anderson et al. | |
| 2016/0014613 A1* | 1/2016 | Ponnampalam | H04W 16/18 370/254 |
| 2016/0134468 A1 | 5/2016 | Hui et al. | |
| 2016/0142252 A1 | 5/2016 | Garg et al. | |
| 2016/0252355 A1 | 9/2016 | Mays et al. | |
| 2016/0366059 A1 | 12/2016 | Bellur et al. | |
| 2016/0366096 A1 | 12/2016 | Gilde et al. | |
| 2017/0142086 A1 | 5/2017 | Chen et al. | |
| 2018/0295529 A1* | 10/2018 | Jen | H04W 24/02 |

FOREIGN PATENT DOCUMENTS

WO 2017016948 A1 2/2017
WO 2017106948 A1 6/2017

* cited by examiner

SYSTEMS AND METHODS FOR CONFIGURING RADIO COMMUNICATION DEVICES

CROSS-REFERENCE TO RELATED APPLICATIONS

This application claims the benefit of U.S. Provisional Application Ser. No. 62/585,200, filed on 13 Nov. 2017, which is incorporated in its entirety by this reference.

TECHNICAL FIELD

The inventions of the present application relate generally to communications routing and radio networking, and more specifically to new and useful systems and methods for configuring a radio communication system.

BACKGROUND

Access to the Internet is now a quintessential requirement for many users and businesses. However, access to reliable internet connectivity is not always available to users and businesses, especially those in remote locations. Internet infrastructure including fiber optic infrastructure development is not always a priority for traditional Internet Service Providers (ISPs) and thus, a remotely located user may not have robust access to the Internet due to limited Internet infrastructure and the like.

Thus, there is a need in the communications routing and computer networking field to create new and useful systems and methods for high-speed Internet connectivity.

DESCRIPTION OF THE PREFERRED EMBODIMENTS

The following description of the embodiments of the present application are not intended to limit the invention to the disclosed embodiments, but rather to enable any person skilled in the art to make and use the inventions described herein.

1. Overview.

Traditional radio installation and radio configuration is a highly manual and intensive process that may include many inaccuracies due to human error or the like. The embodiments of the present application, however, provide methods and systems for automatically generating radio installation parameters and radio configuration parameters. The generated radio installation parameters of the present embodiments may function to provide an optimized or best line of sight for a given radio connection. The generated radio configuration parameters of the present application may function to provide optimized radio configuration or operating parameters that enable a best operation of a radio within a mesh network after installation.

2. System for Network Communication.

Figure 1A:
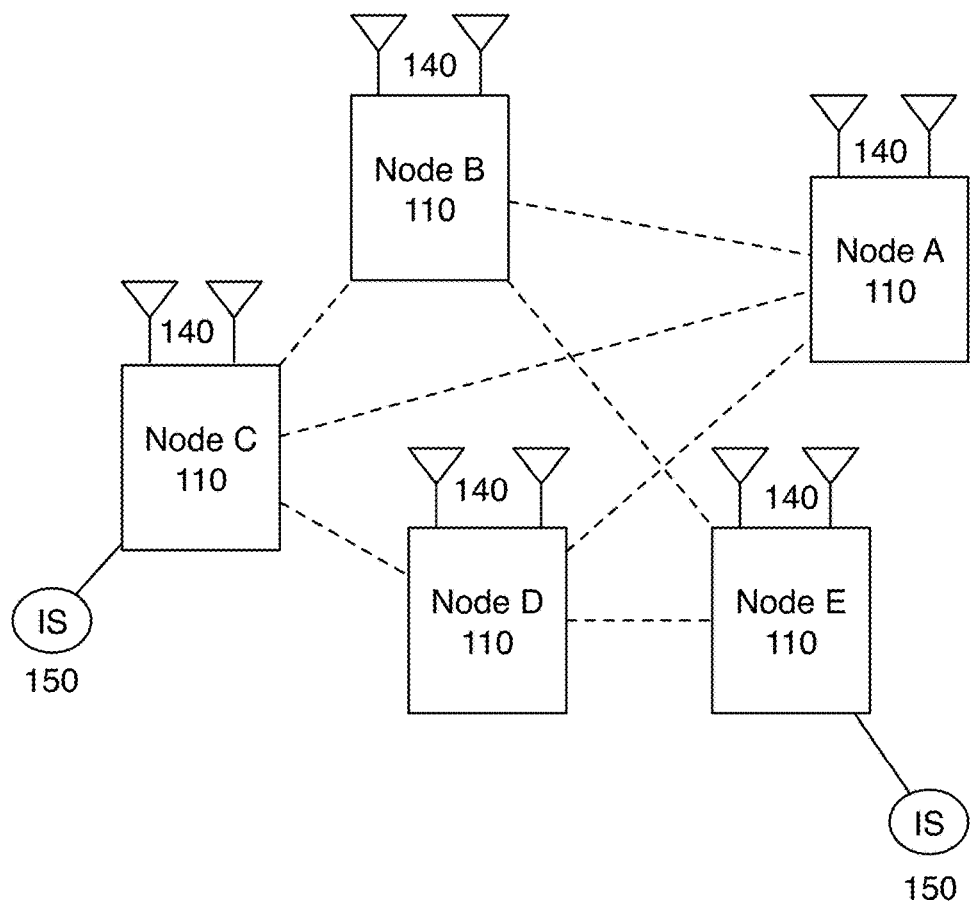
FIGS. 1A-1B are a schematic representations of an embodiment of a system for network communication and an example of the embodiment, respectively.
Figure 1B:
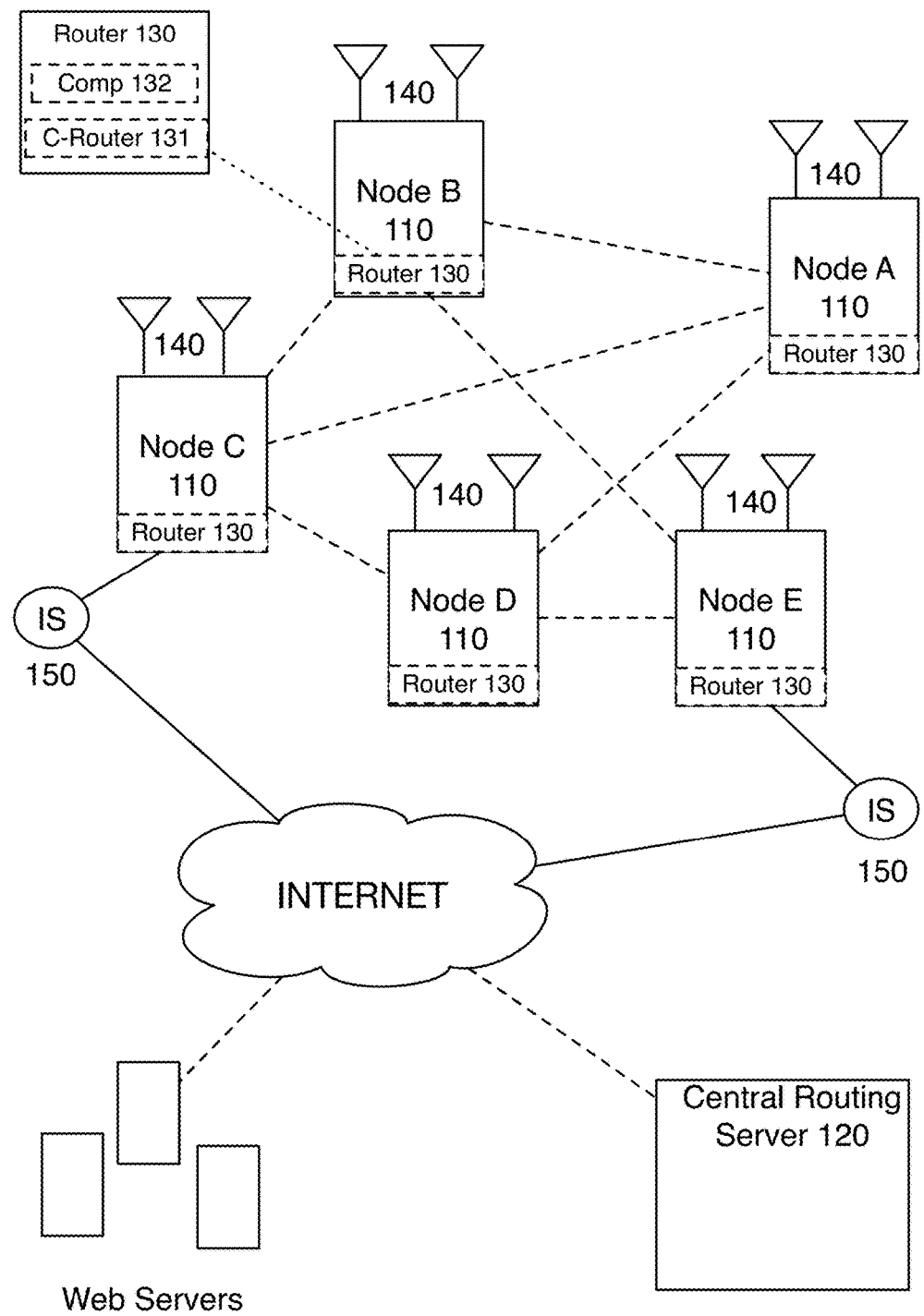

A system 100 for network communication preferably includes a plurality of nodes 110, a central routing server 120, a plurality of routers 130, a plurality of antennae 140, and/or one or more Internet sources 150 (e.g., as shown in FIGS. 1A-1B). The system 100 preferably functions to enable wireless Internet communications between disparate nodes (e.g., each associated with a physical location, region, or site, such as different homes) using radio frequency-based communications. The system 100 can optionally include elements (e.g., the entire system 100, elements thereof, etc.) such as described in U.S. application Ser. No. 15/937,707, filed 27 Mar. 2018 and titled "Systems and Methods for Networking and Wirelessly Routing Communications", which is hereby incorporated in its entirety by this reference.

In some embodiments, each of the plurality of nodes 110 is a home, building, or other structure that is disparate and/or geographically remote from another structure forming one of the plurality of nodes 110 (e.g., each node 110 of the plurality is associated with a different geographic area). In some embodiments, each of the homes forming a node may not be geographically remote from another structure (e.g., townhomes, multi-family units, multi-tenant units, etc.), but still may be distinct in terms of the radio-based communication installed at the location of the structure. For instance, a group of the plurality of homes may represent a group of townhomes that are generally connected to one another but each of the townhomes in the group may be owned or managed by a disparate entity and similarly, wherein each townhome may maintain its own radio-based communication system (or alternatively, may share a communication system with one or more other connected townhomes of the group, and/or with any other suitable homes). Each node may be geographically remote in terms of distance between each other. In this sense, the nodes may be spaced apart in the range of a few feet to possibly a few miles; however, in many instances, the nodes may be 5 feet to 300 feet away from each other, which is typically the distance of homes in a specific neighborhood. Thus, the plurality of nodes 110 may represent all of the homes in a specific neighborhood, which are connected via the system 100 and forming a geographically defined mesh network or the like.

Additionally, or alternatively, the plurality of nodes 110 may be a combination of different types of entities requiring and/or desiring electronic communications (e.g., Internet communications) to be routed between them. For instance, the plurality of nodes 110 may be include homes, buildings, vehicles, electronic devices, computing devices, and the like in a specific geographic region. This combination of devices may be connected via the system 100 to network and route Internet communications between them. Effectively, the plurality of nodes 110, preferably, form a mesh network with the ability to network with one or more neighboring nodes within the mesh to route or pass communications from an initiating node to a destination node and possibly, onward to a larger communication network (e.g., WAN, Internet, etc.).

Generally, the plurality of nodes 110 are preferably configured to communicate with each other wirelessly using radio frequency communications. However, it shall be noted that the plurality of nodes may implement a combination of communication schemes or systems to effectively communicate and/or route communication packets between them including any short-range communication system (e.g., Bluetooth) and/or long-range communication systems (e.g., long-range radio chips, Internet, etc.), and/or can additionally or alternatively communicate in any other suitable manner (or not communicate).

The central routing server 120 preferably functions as a central authority for monitoring the network formed by a plurality of nodes 110 and for controlling the operation of each of the plurality of routers 130 and/or each of the plurality of radios 140 at each of the plurality of nodes. For example, the central routing server 120 can function to determine and/or implement one or more routing tables associated with system operation (e.g., as described in U.S. application Ser. No. 15/937,707, filed 27 Mar. 2018 and titled "Systems and Methods for Networking and Wirelessly Routing Communications", which is hereby incorporated in its entirety by this reference).

Additionally, or alternatively, the central routing server 120 may be hosted on a cloud-based system or distributed computing system. Additionally, or alternatively, the central routing server 120 may include several servers operably connected with each other and operably connected to the network formed by the plurality of nodes 110. Preferably, the central routing server 120 is geographically remote from the plurality of nodes 110; however, there may be one or more centrally controlled servers at or near one or more of the plurality of nodes 110 and usually, near or at an Internet source 150, such as for purposes of encrypting and decrypting data being transmitted between each of the plurality of nodes.

The central routing server 120 can additionally or alternatively function to collect data from each of the plurality of nodes 110. For example, the central routing server 120 may be in operable communication with each of the plurality of routers 130 and each of the plurality of antennae 140. The plurality of routers 130 and antennae 140 may periodically record data and/generate data which the routers 130 and the antennae 140 transmit (e.g., via the Internet or the like) back to the central routing server 120. The recorded and/or generated data may include any data regarding an attribute of the communications being transmitted between the plurality of nodes 110 and, may include, but is not limited to, data regarding operational attributes of each of the nodes (e.g., operations of each router and/or set of antennae at a node).

The central routing server 120 may use the communications and operational data collected from the routers 130 and/or antennae 140 to determine routing paths for current and/or future communications. For example, the central routing server 120 may generate one or more routing tables that include communications routing paths specific to each node of the plurality of nodes 100 that indicates the specific radio links or chain of links that a communication from a node will travel to arrive at its destination. For instance, in a mesh network formed by a plurality of nodes that includes nodes A-E and an Internet source (e.g., destination of communications from nodes A-E), the routing table generated by the central routing server 120 may provide that a communication initiated from node A travels the path A to C to E to Internet source and that a communication initiated at node D travels the path D to A to E to Internet source. Thus, the routing table can define a communications routing path for each of the nodes for transmitting a communication initiating from a specific node to the Internet source and vice versa (e.g., from the Internet source to a specific node).

The routing tables generated by the central routing server 120 may be updated periodically (e.g., every few [2-10 ms] milliseconds to every 10 minutes or so). The routing tables may be updated as frequently as new data is collected from the nodes, such that a significant data update from the nodes may trigger the central routing server 120 to automatically update the routing tables and transmit the updated routing tables to the nodes, especially when it is recognized by the central routing server 120 that one or more nodes may not be operational or functioning properly or the like (e.g., a node is down).

Once the routing tables are generated by the central routing server 120, the central routing server 120 may transmit the generated routing tables to one or more nodes in a networked set of nodes. The nodes receiving the routing tables may then propagate the routing tables to each of its neighboring nodes until all or nearly all of the nodes in the networked set of nodes has the most up-to-date routing tables. Additionally, or alternatively, each of the nodes in the networked set of nodes may continually or periodically ping neighboring nodes to determine whether there are new routing tables available and in that way, the routing tables may be pulled through the system by the requesting nodes rather than pushed through the system by the receiving nodes.

Additionally or alternatively, the central routing server 120 can monitor each of the radio links between connected nodes in a networked set of nodes (or a subset thereof). For example, the central routing server 120 may use the data collected from each of the nodes via the routers 130 and antennae 140 to identify attributes of the radio links between connected nodes. For instance, the central routing server 120 is able to monitor and/or identify a signal strength of a radio link, the utilization of a radio link, the capacity of a radio link, the bandwidth of a radio link, the throughput of a radio link, disconnectivity of a radio link, and the like. Based on the monitoring information, the central routing server 120 is able to determine routing instructions and routing tables. For instance, if the central routing server 120 identifies that a node in a networked set of nodes is malfunctioning and thereby cannot pass communications between nodes, the central routing server 120 may generate a new routing table that avoids making the malfunctioning node a transmitting node (e.g., an intermediary node transmitting communications between an initiating node and a destination node).

Each router 130 (or a subset thereof) of the system preferably includes a combination of an intra-node communications router 131 (e.g., internal structure communications router; Wi-Fi router, transmitter, and/or receiver; wired Ethernet router; etc.) and a computing device 132 (e.g., computer). The communications router 131 is preferably connected to one or more user devices or other routers within a node and functions to route communications between each of the user devices and/or routers and the Internet. The computing device 132 preferably functions to operate communications processing and user (e.g., resident) routing software, such as software that, when executed by the computing device 132, allows the computing device 132 to encrypt out-going communications initiated from the node and decrypt incoming communications received by the node. The computing device 132 preferably functions to generate operational data (e.g., that is communicated to the central routing server 120). Additionally or alternatively, the computing device 132 preferably functions to execute routing functionality (e.g., all routing functionality) for a specific node, optionally including identifying and/or requesting new routing tables and the like.

Each node of the plurality of nodes 110 (or a subset thereof) preferably includes one or more radios 140. Each radio 140 can include one or more radio elements (e.g., transmitters, receivers, antennae, etc.), each preferably including a single transceiver and antenna but alternatively including any suitable radio elements. Each radio 140 is preferably configured to communicate with one or more other radios 140 of the system 100 (e.g., is communicatively coupled to the one or more other radios via a radio communication link), more preferably operating on a single frequency channel (or set of channels) at a given time. The system 100 (e.g., the radios 140 of the system) preferably defines a set of radio groups, wherein each pair of radios 140 that are configured to communicate together via one or more radio-based inter-node communication methods (e.g., are communicatively coupled to each other via radio communication links) define a radio group of the set.

Each radio (or a portion thereof, such as one or more of the antennae) is preferably positioned at an external location of the node (e.g., on the exterior of a building associated with the node, outside and near the building, etc.), but can additionally or alternatively be positioned at an internal location (e.g., within a building associated with the node) and/or in any other suitable location. For instance, if the node is a home, the radios (e.g., antennae) can be positioned external to an interior of the home, preferably positioned on the home and/or at a position adjacent or immediately next to the home. Each node may include one or more radios and/or antennae (e.g., 1-4 or 1-n radios and/or antennae) that may be positioned in various location and/or oriented in various directions in order to establish multiple connections with one or more radios (e.g., antennae) of disparate nodes. The radios (e.g., antennae) of a node are preferably arranged in one or more radio clusters (more preferably, a single radio cluster), wherein each radio cluster includes one or more radios substantially collocated at a radio cluster location (e.g., within the geographic area of the node, such as on the roof of the building associated with the node). For example, the radios of a node can be mounted on a shared mounting structure (e.g., the radios arranged at different heights on a substantially vertical mounting structure, such as arranged substantially above and/or below each other) affixed to a roof at the radio cluster location, preferably wherein each radio is oriented in a different direction (e.g., toward a radio of a different node, toward a potential future node location, etc.). However, the radios can additionally or alternatively be arranged in any other suitable manner.

Each of the radios at a specific node may be used to establish active and potential links with other radios (e.g., of neighboring nodes, of nearby nodes, etc.). An active link between radios of two disparate nodes may representative a communications link determined by a routing table generated by the central routing server 120. A potential link between radios of two disparate nodes may represent communication links that are not currently in use but may become active links depending on a new routing table. The radio groups can be defined, for example, based on the active links, potential links, and/or any other suitable communication links between the radios 140.

The radio(s) 140 of a node are preferably communicatively coupled, by one or more intra-node communication mechanisms, to each other and/or to one or more other electronic devices of (and/or associated with) the node, such as the router 130, user devices (e.g., smart phone, tablet, computer, smart TV, etc.), and/or any other suitable devices. Preferably, each node is defined as including all of a set of devices that are communicatively coupled by the intra-node communication mechanism(s), but alternatively radio(s) 140 of a node can be communicatively coupled to devices of other nodes by an intra-node communication mechanism (e.g., facilitated by the router(s) 130 of the node). The intra-node communication mechanisms can include wired connections (e.g., Ethernet connections, coaxial cable connections, fiber optic connections, etc.), wireless connections (e.g., implemented using protocols such as Wi-Fi, Bluetooth, Thread, ZigBee, Z-Wave, etc.), and/or any other suitable connections. The intra-node communication mechanisms are preferably distinct from the inter-node communication mechanisms (e.g., do not include the radio links implemented by the radios 140), but can alternatively include the inter-node communication mechanisms.

In one embodiment, each radio 140 of a node can be connected via a wired connection mechanism (e.g., wired Ethernet connection) to the router 130 of that node, and various other electronic devices (e.g., user devices, other routers and/or access points, etc.) of the node can be connected to the router 130 (e.g., via wired connections such as wired Ethernet, via wireless connections such as Wi-Fi, etc.). In a variation of this embodiment (e.g., wherein the node is associated with multiple entities, such as user accounts associated with different residential units of a multi-unit building), the node includes multiple routers 130 (e.g., one for each residential unit), each connected to the radio(s) 140 of the node. However, the radios 140 and/or other devices of a node can additionally or alternatively be connected in any other suitable manner.

The Internet sources 150 can include media, such as fiber optic cables that are generally fixed in position relatively to a networked set of nodes. Additionally, or alternatively, the Internet sources 150 may include one or more wireless links (e.g., gigabit+ wireless link) to a datacenter or other intermediary for a backhaul (backbone) connection to the Internet. The Internet sources 150 may include a plurality of Internet access points (e.g., positioned proximate to one or more nodes of the networked set of nodes). One or more of the Internet sources 150 can additionally or alternatively enable access to any other suitable networks (e.g., instead of and/or in addition to the Internet). Each of the plurality of Internet access points may be hardwire connected to the one or more nodes within the mesh radio network. At each of the Internet access points may be one or more centrally-controlled servers or computers that are able to decrypt communications and/or data received from a node prior to sending the communications through the fiber optic cables to an Internet server. Additionally, the one or more centrally controlled servers or computers may encrypt communications and/or data from the Internet server prior to forwarding the communication to a destination node. In this way, requests and data communications from a node in a networked set of nodes is kept secure and private from other nodes (e.g., transmitting nodes) in the networked set of nodes.

However, the system can additionally or alternatively include any other suitable elements, having any suitable functionalities, in any suitable arrangement.

3. Method for Configuring Radio Communication Devices.

Figure 2A:
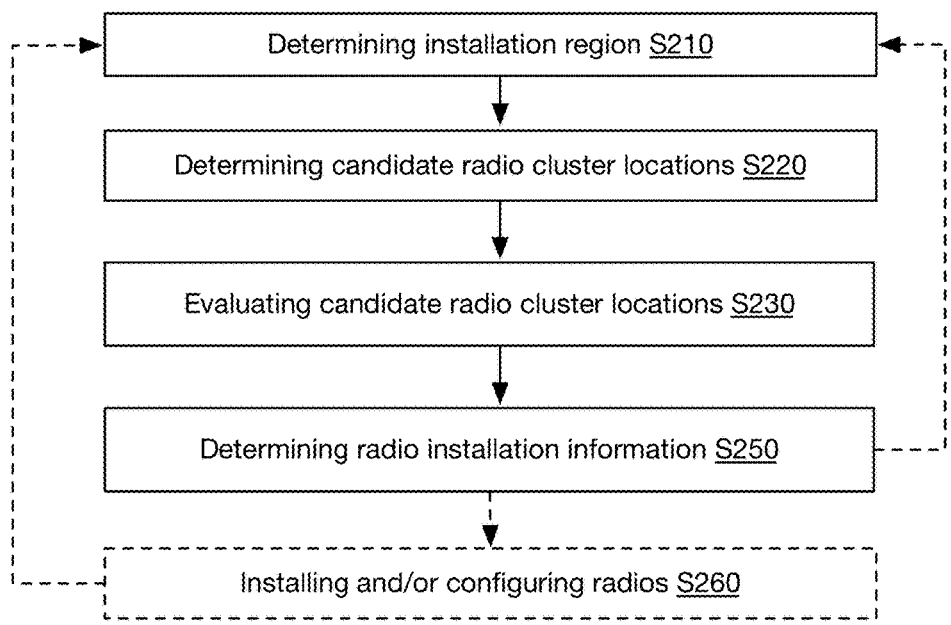
FIG. 2A is a schematic flow representation of an embodiment of a method for configuring radio communication devices.

A method 200 for configuring radio communication devices preferably includes: determining an installation region S210, determining candidate radio cluster locations S220, evaluating candidate radio cluster locations S230, and/or determining information associated with radio installation S250; and can optionally include installing and/or configuring radios S260 (e.g., as shown in FIG. 2A). However, the method can additionally or alternatively include any other suitable elements performed in any suitable manner.

Figure 2B:
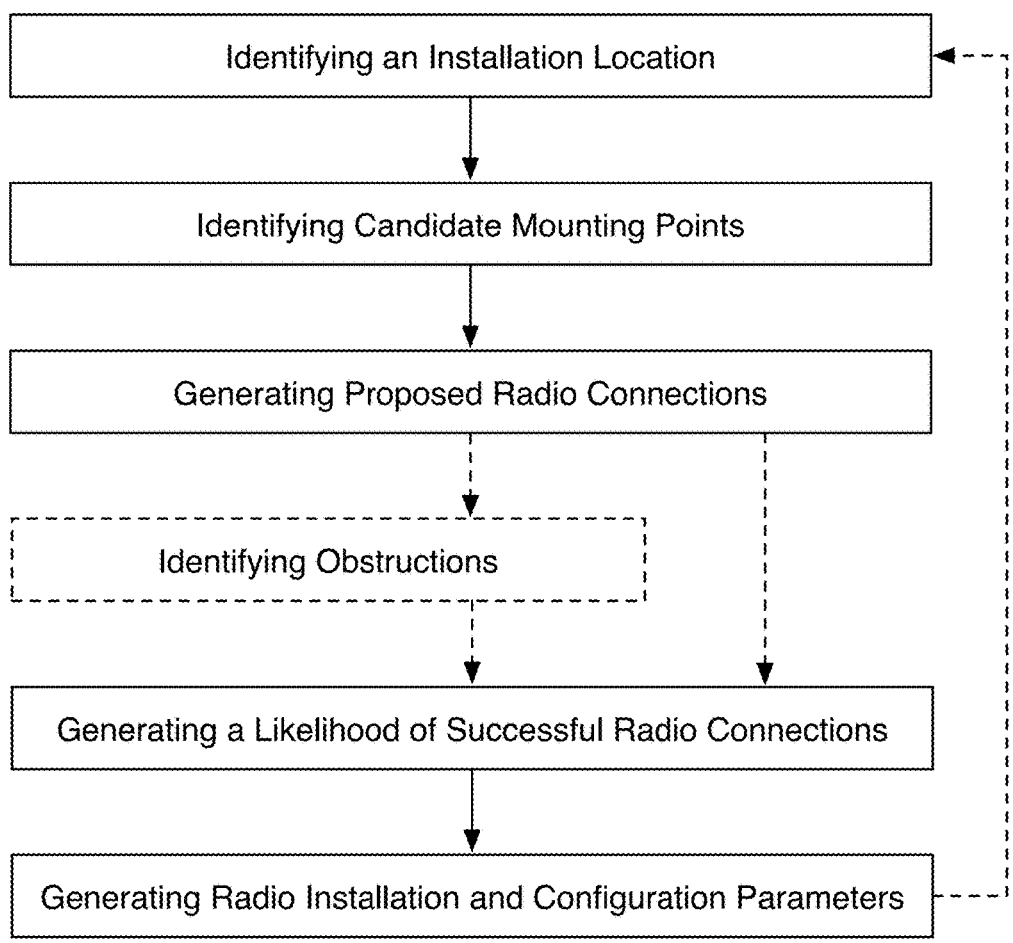
FIG. 2B is a schematic flow representation of an example of the embodiment of the method.

In one embodiment, the method includes: receiving one or more connection requests; identifying an installation location for one or more radio nodes; identifying candidate mounting locations for each of the one or more radio nodes; generating proposed radio connections; generating a likelihood or probability of a successful radio connection; and/or generating radio installation parameters and radio configuration parameters; and can optionally include identifying obstructions along the proposed radio connections (e.g., as shown in FIG. 2B).

The method is preferably implemented using the system 100 (e.g., as described above), but can additionally or alternatively be implemented using any other suitable network- and/or radio-based system.

3.1 Determining an Installation Region.

Determining an installation region S210 preferably functions to determine a geographic region for installing one or more radios (e.g., associated with a node, such as a new node being created in the region). For example, S210 can include determining the geographic region associated with the physical location of the node, such as a physical address (e.g., 123 Main St., San Francisco, Calif.) of the desired installation site or physical coordinates (e.g., latitude and longitude) of, within, and/or near the desired installation site. S210 can additionally or alternatively include converting the geographic location data into geolocation input data for mapping the installation region onto a two-dimension and/or three-dimensional representation of a geographic area including and surrounding the desired installation region.

In some embodiments, S210 can includes receiving one or more connection requests S211. S211 preferably functions to collect inbound request to establish a radio node at a requestor's location. The connection request may include an identification of a desired location for establishing a new radio node within a radio mesh network. The connection request may additionally indicate a number of radios requested to be installed for establishing a connectivity of the radio node with the radio mesh network. The connection request may additionally indicate a desired average or minimum bandwidth for a radio communication connection established via the radio node.

In some of these embodiments, the one or more connection requests may be routed to a connection queue. In such embodiments, when it is determined that a radio connection cannot be established at the desired location provided with the connection request, S211 may function to automatically route the connection request to the connection queue. Within the connection queue, the connection request may remain pending until sufficient radio nodes are installed providing a radio mesh network in proximity to the desired location into which a radio node at the desired location may be connected to.

Accordingly, once sufficient radio nodes are installed in proximity to a desired location for installing a radio node, S211 may include automatically pulling the connection request from the connection queue and routing the connection request to an active installation queue. The active installation queue generally comprises a database in which connection requests that include a desired installation location that are suitable for immediate radio connection are placed. That is, the desired installation location of these connection requests may be in sufficient proximity to a pre-existing mesh network of radio nodes, such that a radio connection of a new radio node at a desired location may be established.

In such embodiments in which S211 is included, the installation region is preferably determined based on one or more of the connection requests. For example, S210 can include determining the installation region based on the connection request data received in S211 (e.g., wherein the installation region is associated with and/or equivalent to the desired location specified in the connection request, such as the region associated with an installation address specified in the connection request). For example, S210 can include pulling one or more connection requests from the active installation queue and determining the installation region(s) based on the pulled connection request(s).

However, S210 can additionally or alternatively include determining the installation region in any other suitable manner.

3.2 Determining Candidate Radio Cluster Locations.

Determining candidate radio cluster locations S220 preferably functions to identify, within a coarse geographic location (e.g., the installation region determined in S210), one or more specific geographic locations (i.e., candidate radio cluster locations, such as candidate points for mounting and/or otherwise installing a cluster of one or more radios) for potentially locating (e.g., installing) one or more radios (e.g., a radio cluster), such as for establishing one or more radio connections. For each of the candidate radio cluster locations (e.g., mounting points), S220 may function to generate coordinates (e.g., three-dimensional coordinates), preferably including a latitudinal, a longitudinal, and/or a height coordinate (e.g., X-, Y-, and/or Z-coordinates) for a given candidate radio cluster location; however, the candidate radio cluster locations can additionally or alternatively be specified in any other suitable manner (e.g., relative to each other, to landmarks, to locations of other radios of the network, etc.).

In some embodiments, S220 may function to generate a plurality of candidate radio cluster locations along a physical structure within the coarse geographic location. For instance, one or more physical structures, such as a commercial building or a residential building may be identified within the coarse geographic location. Once the physical structure is identified, S220 may function to generate proposed or candidate radio cluster locations for the one or more radio nodes along an external surface of the physical structure. For example, S220 can generate the proposed or candidate mounting locations along top surfaces of the physical structures (e.g., at the highest-elevation points of the physical structure, along a spline of a rooftop and/or other high point(s) of the physical structure, throughout one or more top surfaces of the physical structure such as regularly arrayed across the surface(s), etc.).

Additionally, or alternatively, S220 may function to generate a plurality of candidate radio cluster locations immediately surrounding a physical structure within the coarse geographic location. For instance, one or more physical structures, such as a commercial building or a residential building may be identified within the coarse geographic location. Once a physical structure is identified, S220 may function to generate proposed or candidate mounting locations for the one or more radio nodes in an area surrounding the physical structure, such as ground locations within a few feet (e.g., within 1 feet to 20 feet) of the building structure.

In a first embodiment, S220 includes generating candidate radio cluster locations on (and/or near, such as above by an amount corresponding to the height of a radio cluster support) one or more surfaces (e.g., rooftops, ground locations, etc.). In a first variation of this embodiment, the locations are determined based on expected performance criteria, such as height (e.g., preferentially selecting higher locations), obstacle information (e.g., preferentially avoiding locations near obstacles that may impede radio communication), and/or any other suitable criteria. In a second variation, the locations are distributed (e.g., arranged substantially evenly) throughout the surface(s). For example, the locations can be regularly arrayed (e.g., separated by a predetermined distance, such as 0.1, 0.5, 0.075, 1, 1.25, 1.5, 2, 3, 5, 10, 0.05-0.2, 0.2-0.8, 0.8-2, 2-5, or 5-20 m, etc.; arrayed based on the surface dimensions, such as to include a predetermined number of locations on the surface, such as 6, 10, 25, 50, 100, 300, 1000, 1-10, 10-40, 40-200, 200-1000, or 1000-5000, etc.; arrayed in square, rectangular, hexagonal, and/or any other suitable arrays; etc.) across the surface(s). However, the locations can be determined in any other suitable manner.

Additionally, or alternatively, S220 may function to identify installation parameters (e.g., mounting parameters) that identify one or more specific parameters for installing (e.g., mounting and/or physically configuring) the one or more radio nodes at a given candidate location. For example, installation parameters may include a number of radios to be installed at a candidate radio cluster location (i.e., number of radios in the cluster), headings of the one or more radio, positioning angles between the one or more radios, prospective bandwidth that can achieved by a given radio, proposed radio frequencies for each of the one or more radios, and the like. For instance, a given radio cluster location may include one to six radios (or more), which may be typical for a residential radio cluster location or the like. More radios may be installed for radio cluster locations that are commercial in nature.

Additionally, or alternatively, once the one or more candidate radio cluster locations are identified, S220 may function to map the one or more candidate radio cluster locations to virtual representation of the physical structure and/or surrounding area onto which the one or more radio nodes may potentially be mounted. That is, S220 may generate a drawing or other digital illustration of the candidate radio cluster locations such that the candidate radio cluster locations can be visually inspected by a user or the like.

However, S220 can additionally or alternatively include any other suitable elements performed in any suitable manner.

3.3 Evaluating Candidate Radio Cluster Locations.

Figure 5:
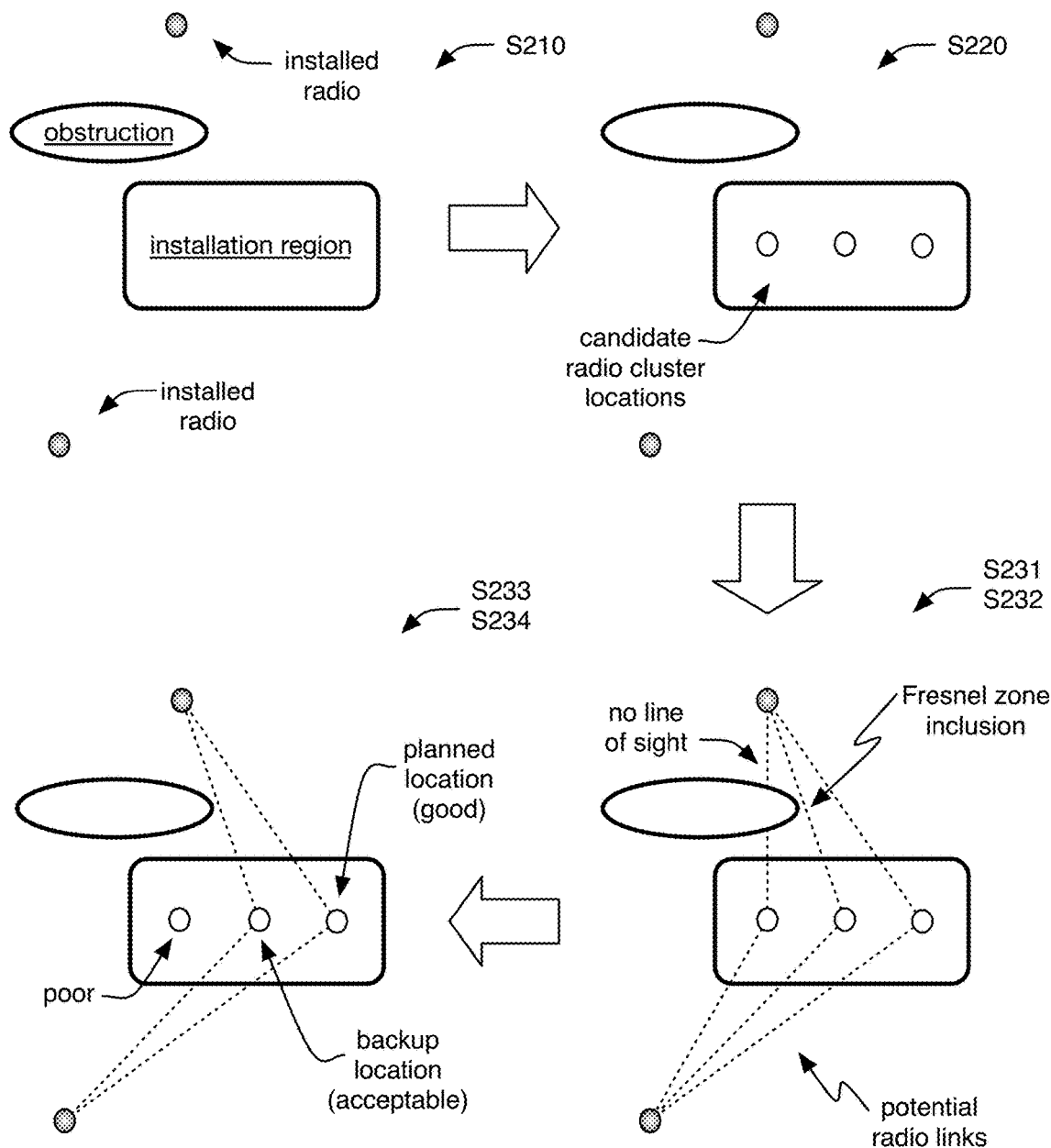
FIG. 5 is a schematic representation of an example of evaluating candidate radio cluster locations.

Evaluating candidate radio cluster locations S230 preferably functions to determine the expected performance and/or value of the candidate locations. S230 preferably includes: determining potential radio links S231, evaluating potential radio links S232, determining a candidate radio cluster location evaluation S233, and/or selecting a planned location S234 (e.g., as shown in FIG. 5). However, S230 can additionally or alternatively include any other suitable elements performed in any suitable manner.

S230 preferably includes performing S231, S232, and S233 (and/or any other suitable elements) for each of a set of candidate radio cluster locations (e.g., the locations determined in S220, a subset thereof, etc.). For example, these elements can be repeated for each candidate radio cluster location, performed substantially concurrently (e.g., in parallel, in combination, etc.) for each candidate radio cluster locations, and/or performed in any other suitable manner. However, S230 can additionally or alternatively include performing any or all of these elements (and/or any other suitable elements) any suitable number of times for any suitable candidate radio cluster locations.

Determining potential radio links S231 preferably functions to determine which installed radios could communicate with radios at the candidate radio cluster location (if a radio cluster were installed at the candidate location). S231 preferably includes determining a set of potential radio links between the radio cluster location and one or more installed radios of the set of installed radios. S231 is preferably performed based on the candidate radio cluster location, an installed radios dataset, and/or an obstructions dataset. Each potential radio link is preferably a link between a potential radio at the candidate radio cluster location and an installed radio (e.g., from the installed radios dataset). Each potential link from a cluster location is preferably associated with a different installed radio (but alternatively, the set of potential radio links can include multiple links to the same installed radio, such as links associated with different positions within the candidate radio cluster location).

Each link preferably defines a direct line (e.g., line of sight, direct transmission path) between the two radios (e.g., the installed radio and a radio of the candidate radio cluster location), and preferably defines one or more Fresnel zones (e.g., first Fresnel zone, second Fresnel zone, third Fresnel zone, etc.) between and around the two radios. The Fresnel zones are a series of confocal prolate ellipsoidal regions, wherein the direct line is collinear with and centered on the major axis of the ellipsoids. The Fresnel zones are defined such that, at any point along the direct line between the radios, the nth Fresnel zone radius $F_n$ at that point (defining a circle normal to the direct line and centered on the point) is approximately defined by:

$$F_n = \sqrt{\frac{n\lambda d_1 d_2}{d_1 + d_2}}$$

wherein $d_1$ is the distance between the point and the first radio, $d_2$ is the distance between the point and the second radio, and $\lambda$ is the radio wavelength transmitted by the radios. For example, for two radios separated by 300 m, the maximum radius of the first Fresnel zone (occurring at the midpoint of the direct line) is approximately 2.1 m for 5 GHz transmissions and 0.6 m for 60 GHz transmissions, and for two radios separated by 1 km, the maximum radius of the first Fresnel zone is approximately 3.9 m for 5 GHz transmissions and 1.1 m for 60 GHz transmissions.

The installed radios dataset preferably includes locations and/or orientations of a set of installed radios (e.g., other radios of the system 100). For example, the dataset can include, for each installed radio, a position (e.g., coordinates, preferably 3-dimensional coordinates; position relative to a reference point, such as a radio cluster location; etc.) and orientation (e.g., antenna orientation, such as primary transmission direction), and can additionally or alternatively include information such as radio type, radio capabilities (e.g., radio wavelength, transmission power, range, etc.), and/or any other suitable information associated with the radio. In some embodiments, the installed radios dataset includes radio cluster locations (e.g., analogous to the candidate radio cluster locations described above).

The installed radios dataset can include all installed radios, include only radios available for connection (e.g., radios not currently participating in a radio link, radios that are functioning correctly, radios associated with nodes that are connected to the network, etc.), and/or any other suitable set of radios. If the installed radios dataset includes radios that are not (or may not be) available for connection, the dataset preferably includes an indication of radio availability. The potential radio links preferably only include links to available radios, but can additionally or alternatively include any other suitable links.

The installed radios dataset can optionally include information associated with planned radios (e.g., radios that are planned to be installed at a particular location and/or in a particular orientation, such as radios associated with a selected radio cluster location) and/or potential radios (e.g., radios that may be installed, such as radios associated with a backup radio cluster location, radios associated with a selected radio cluster location for an installation task that is on hold, etc.). S230 can optionally include considering (e.g., as secondary and/or tertiary options, as equivalent to installed radios, etc.) and/or disregarding the planned and/or potential radios. For example, the planned radios can be considered as secondary options (e.g., wherein links to installed radios are preferred over links to planned radios) and the potential radios can be considered as tertiary options or can be disregarded. However, the installed radios dataset can additionally or alternatively include any other suitable information associated with the radios, and/or can be considered in any other suitable manner.

The obstructions dataset preferably includes the locations and/or other characteristics of a set of obstructions. The obstructions dataset is preferably determined based on a line-of-sight survey (e.g., using lidar, radar, sonar, photographs, etc.). The obstructions dataset can additionally or alternatively be determined based on aerial survey data (e.g., aerial and/or satellite photographs) and/or any other suitable information. The obstructions dataset can include, for example, a point cloud, polygons, volumes, and/or any other suitable representations of obstructions in an area (e.g., area associated with the system 100).

The set of potential radio links is preferably determined based on a line of sight evaluation using information from the obstructions dataset. For example, obstructions along the direct line of each potential radio link can be considered (e.g., wherein any potential radio link whose direct line intersects at least a threshold number of obstructions, preferably a single obstruction but alternatively any other suitable number of obstructions, can be excluded from the set). The set of potential radio links can additionally or alternatively be determined based on evaluation of a volume associated with the link (e.g., as described below regarding S232). However, the obstructions database can be used in any other suitable manner for performing S231 (or can alternatively not be used).

S231 preferably includes considering all potential radio links for a given candidate radio cluster location. For example, S231 can include considering links to all (available) installed radios that are within communication range of the candidate radio cluster location and/or are within a threshold distance associated with a communications performance metric greater than a threshold. Additionally or alternatively, S231 can include considering only potential radio links of a shorter distance (e.g., within a predetermined radius of the candidate location, within a dynamically-determined radius, such as determined based on local network density, expected network growth in the area, etc.). For example, in areas associated with current and/or expected high radio cluster density, the potential radio link length can be restricted to a shorter distance (e.g., even if links of longer lengths would also be expected to allow sufficiently performant communications between the radios of the link). Such a restriction can function to promote the installation and/or configuration of a tightly-connected network, and/or can leave radios in less densely connected areas available for future connection to nearby radios (e.g., radios to be installed in the future, such as during another performance of the method 200).

Figure 3:
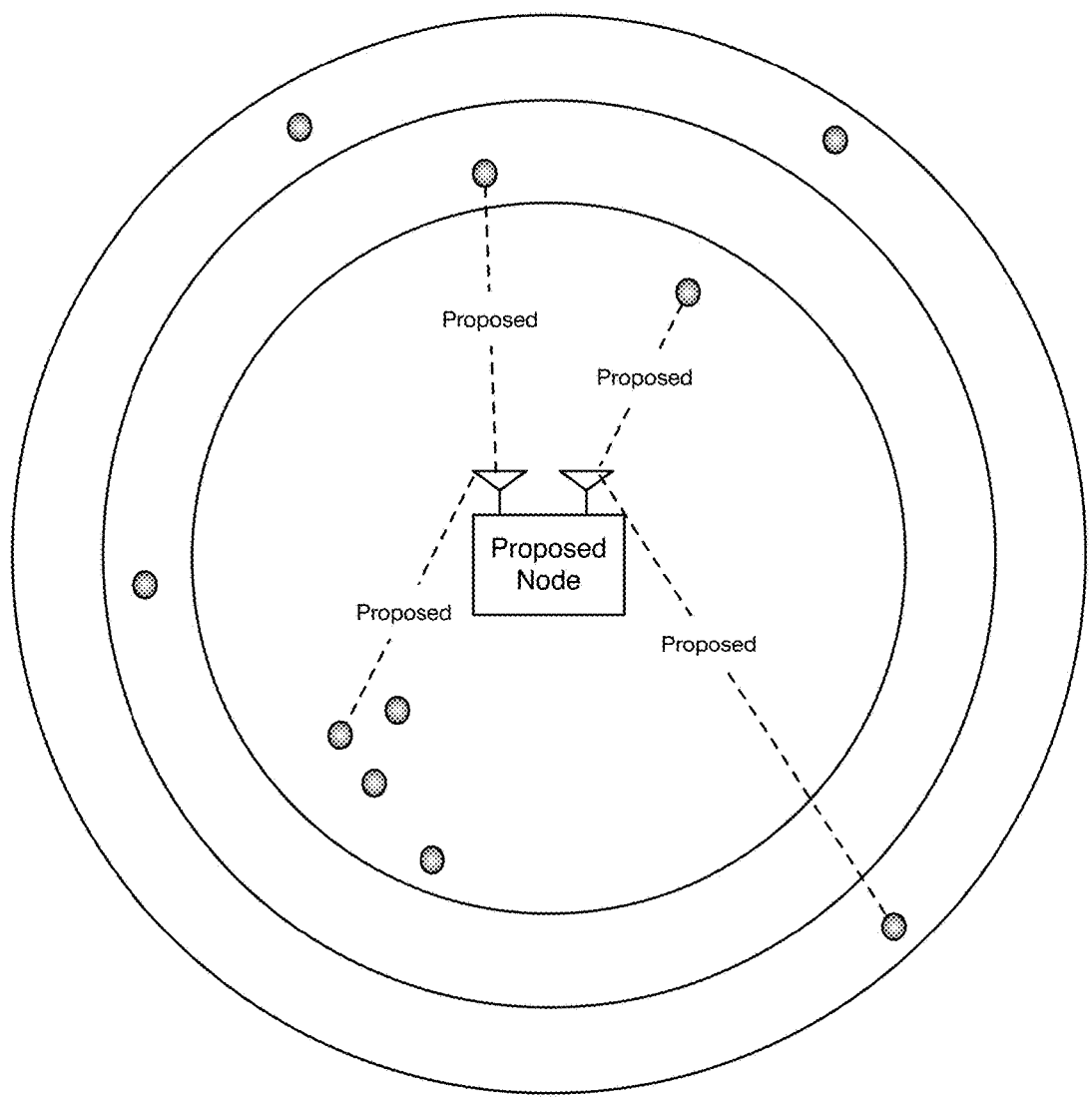
FIG. 3 is a schematic representation of an example of a system for identifying proposed radio connections in accordance with embodiments of the present application.

Additionally or alternatively, S231 can include determining potential radio links based on an escalating or growing radius originating at each of the candidate radio cluster locations (e.g., as shown in FIG. 3). For instance, S231 may function to define a first radius surrounding a given candidate radio cluster location. Within the first radius, S231 may function to determine the (available) installed radios within the first radius (e.g., based on the installed radios dataset). Once the installed radios within the first radius are determined, S231 may function to generate potential radio links between the installed radios within the first radius and the candidate radio cluster location. If an insufficient number of potential radio links (e.g., proposed radio connections) are found within the first radius and/or it is determined (e.g., in S232) that the quality of the potential radio links is poor or insufficient, S231 may function to escalate from the first radius to a second radius (e.g., greater than the first radius). In determining whether a number of potential radio links within a given radius is sufficient, S231 may function to apply a potential radio link threshold that, if satisfied, indicates that a sufficient number of potential radio links exist within the radius. For instance, the potential radio link threshold may include four or more unobstructed or minimally obstructed potential radio links. In escalating the radius, S231 may function to increase the radius from the candidate mounting locations gradually or in a stepped manner (e.g., until a sufficient number of suitable potential radio links are identified). For instance, S231 may function to set a first radius of five hundred meters (from a candidate radio cluster location), a second radius of one thousand meters, a third radius of fifteen hundred meters from the candidate radio cluster location, and the like.

Figure 4:
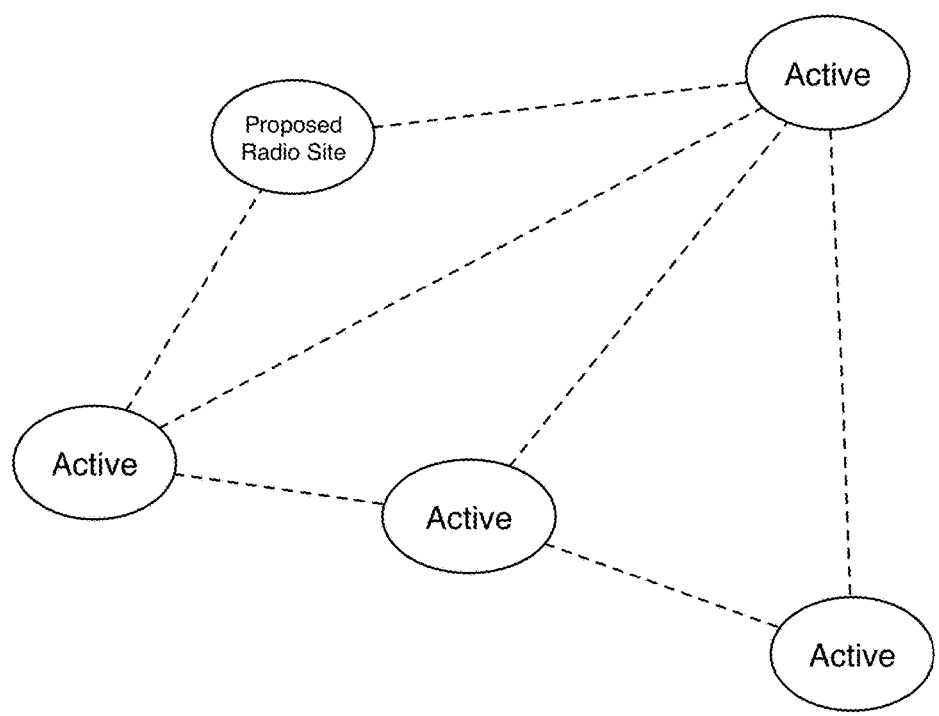
FIG. 4 is a schematic representation of an example system for identifying obstructions in proposed radio connections in accordance with embodiments of the present application.

S231 can additionally or alternatively include mapping and/or illustrating the potential radio links (e.g., proposed radio connections) onto a virtual representation of a geographical area that includes the candidate radio cluster locations and/or the installed radios (or a subset thereof, such as the installed radios associated with the potential radio links), such as shown by way of example in FIG. 4.

However, S231 can additionally or alternatively include determining potential radio links in any other suitable manner.

Evaluating potential radio links S232 preferably functions to determine the expected performance and/or benefit of the radio links (e.g., to determine the likelihood of successful radio connections). S232 preferably includes (e.g., for each potential radio link of the set of potential radio links determined in S231, for a subset thereof, etc.) determining a link evaluation. The link evaluations are preferably determined based on the obstructions dataset and/or a network dataset. However, S232 can additionally or alternatively include evaluating the potential radio links based on any suitable information.

The potential radio links are preferably evaluated based on obstructions that may interfere with and/or otherwise reduce the performance of the radio links (e.g., as described above regarding S231). In one example, S231 includes performing a line-of-sight obstruction evaluation based on the direct line of the potential radio links and S232 includes performing a volumetric evaluation associated with a link.

However, S230 can additionally or alternatively include performing any suitable obstruction evaluations at any suitable time.

The volumetric evaluation can be an evaluation (e.g., clearance evaluation) of a volume associated with the potential radio link (e.g., presence and/or inclusion value of obstacles within the volume, such as a Fresnel zone or conical volume associated with the link, preferably performing a clearance evaluation of the first Fresnel zone). For example, S232 can include calculating an obstruction metric associated with the volume (e.g., inclusion of obstructive objects within the volume, such as a ratio of the volume of the obstructive objects to the total volume). In such embodiments, if the calculated inclusion percentage is greater than an inclusion threshold, S232 may function to judge the potential radio link to be poor, bad, or unusable (and/or determine that an obstructions-related evaluation component is poor); whereas, if a calculated inclusion percentage is lower than an inclusion threshold, S232 may function to judge the potential radio link as a valid candidate for establishing a radio connection between a candidate radio cluster location and an active radio connection (and/or determine that an obstructions-related evaluation component is good). Alternatively, the potential radio link evaluation can be determined with respect to multiple (e.g., 2, 3, 5, 10, etc.) threshold values (e.g., evaluated as unacceptable for inclusions greater than an upper threshold, evaluated as excellent for inclusions less than a lower threshold, evaluated as moderate for inclusions between the threshold values) and/or along a continuum of values (e.g., numerical score assigned based on the inclusion percentage). In examples, the threshold(s) can be 40%, 30%, 20%, 15%, 10%, 7.5%, 5%, 3%, 2%, 1%, 0.5%, 0.1-1%, 1-2%, 2-5%, 5-10%, 10-15%, 15-25%, 25-35%, 35-50%, and/or any other suitable amount. It shall be noted that the inclusion threshold may be dynamic and based on a desired link quality. For instance, for a greater link quality, a lower inclusion threshold (e.g., 20%, 15%, 10%, 5%, 5-10%, 10-20%, less than 5%, etc.) may be applied. Alternatively, for link quality not requiring high levels of quality, a higher inclusion threshold (e.g., 20%, 25%, 30%, 35%, 40%, 50%, 20-30%, 30-40%, greater than 40%, etc.) may be applied in evaluating potential links. However, obstructions associated with the potential radio links can additionally or alternatively be considered in any other suitable manner.

The network dataset preferably includes information associated with a network that includes the set of installed radios (e.g., information associated with the system 100). For example, the network dataset can include any suitable network-related information such as described in U.S. application Ser. No. 15/937,707, filed 27 Mar. 2018 and titled "Systems and Methods for Networking and Wirelessly Routing Communications", which is hereby incorporated in its entirety by this reference (e.g., routing table(s), monitoring information, etc.). However, the network dataset can additionally or alternatively include any other suitable network information.

Evaluating the potential radio links based on the network dataset can include evaluating the potential links based on criteria such as upstream performance (e.g., performance of the upstream radio and/or node, such as bandwidth, computational performance available for routing tasks, etc.), route capacity, redundancy, predicted demand for the upstream radio and/or node, potential radio interference, and/or any other suitable factors.

Evaluating the potential radio links based on predicted radio demand can include, for example, determining that an area has a high current and/or predicted rate of installation requests (e.g., high new customer onboarding rate). The determination can be made based on one or more queues (e.g., connection queue, active installation queue, etc.), network analyses, market analyses, and/or any other suitable information. In response to this determination, a high predicted demand can be associated with nodes in that area and/or radios aimed toward the area (e.g., capable of communicating with current, projected, and/or potential radios within the area). Potential radio links including such high demand nodes and/or radios can be evaluated as lower benefit (e.g., due to an incentive to keep the radios available for future potential radio links).

Evaluating the potential radio links based on potential interference can include, for example, accounting for installed radios of the network (e.g., radios operating on the band and/or channel associated with the potential radio link), accounting for other radio traffic (e.g., on the band and/or channel), and/or accounting for potential interference in any other suitable manner. Higher likelihood of interference preferably results in a lower-benefit evaluation of the potential link. However, evaluating the potential radio links based on the network dataset can additionally or alternatively include evaluating the potential radio links based on any other suitable information.

The potential radio links can additionally or alternatively be evaluated based on the likelihood of a successful radio connection, and/or based on one or more information sources such as those described below regarding determining the likelihood of a successful radio connection. For example, the link evaluation can be determined based on the distance between a candidate radio cluster location and an installed radio (e.g., the length of the direct line of the potential radio link; if the link were formed, the distance between radios of the link). However, the link evaluation can additionally or alternatively be determined based on any other suitable information.

S232 can additionally or alternatively include determining (e.g., generating) a likelihood (e.g. probability) of successful radio connection associated with a potential link (and/or otherwise evaluating the potential radio links based on criteria and/or information such as described below regarding determining such a likelihood). Determining the likelihood of success preferably functions to determine) a likelihood of establishing a successful radio connection from a candidate radio cluster location to an installed radio. For example, it may function to extract the features of each of the potential radio links and convert the extracted features into inputs for calculating a likelihood that a given potential radio link will be successful and/or beneficial.

Determining the likelihood may function to extract features, such as distance between a candidate radio cluster location and an installed radio (where a greater distance may increase the power required for transmission, and correspondingly reduce a strength and/or quality of the radio connection), one or more obstruction metrics such as an inclusion value (e.g., as described above), available bandwidths, available frequencies, potential interferences (e.g., as described above) such as from neighboring radios, and/or the like. The aforementioned features of a potential radio link are just examples of the features that may be extracted in considered when determining a likelihood of a successful connection and thus, the features that may be used should not be limited thereto.

Determining the likelihood may function to weigh each of the extracted features differently, and in some embodiments, the weights for each extracted feature may be predetermined (e.g., based on one or more desired qualities of the radio connection).

Accordingly, determining the likelihood may function to generate a likelihood of a successful radio connection for each of the potential radio links based on a calculation using one or more extracted features of each respective potential radio link.

Additionally, or alternatively, determining the likelihood may function to rank each of the potential radio links based on the generated likelihood of successful radio connection (e.g., as described below, such as regarding S233 and/or S234). For instance, determining the likelihood may function to provide a high or preferred ranking to those connections having higher likelihoods of being a successful radio connection. Additionally, or alternatively, determining the likelihood may automatically populate or select a subset of the potential radio links for installing radios based on the rankings assigned to each of the potential radio links (e.g., as described below, such as regarding S234). That is, determining the likelihood may populate a ranked list of potential radio links, with each potential radio link having an associated probability of successful radio connection corresponding thereto, and may select those potential radio links on the list having the highest values or values satisfying or exceeding a suitability threshold.

However, S232 can additionally or alternatively include evaluating potential radio links in any other suitable manner.

Determining the candidate radio cluster location evaluation S233 preferably functions to determine the expected performance and/or benefit of the radio cluster location. S233 preferably includes determining a respective location evaluation for the candidate radio cluster location, more preferably based on one or more of the link evaluations associated with the candidate radio cluster location (e.g., link evaluations for potential radio links including the candidate radio cluster location).

In one embodiment, S233 includes selecting a subset of the potential radio links. The subset can be selected based on the link evaluations, the network dataset, the obstructions dataset, and/or any other suitable information. This embodiment preferably includes selecting the subset expected to provide the greatest performance and/or benefit (e.g., for the overall network, for the predicted future state of the network, for the node being installed, etc.).

Selecting the subset based on the link evaluations can include selecting links with the best evaluations, selecting links with evaluations greater than a threshold amount (e.g., absolute threshold, threshold relative to other link evaluations, such as the best, average, median, first quartile, etc.).

Selecting the subset based on the network dataset can include selecting links to prioritize network redundancy. For example, the selection process can offer preference to upstream nodes that are far apart in the network topology (e.g., having significantly different routes to an internet source, having a large minimum path between them such as a minimum path including more than a threshold number of nodes, etc.) rather than selecting several links to nodes that are close in the network topology (e.g., share similar routes to an internet source, have one or more short paths between them, etc.).

Selecting the subset based on the obstructions dataset preferably includes prioritizing redundancy in obstruction avoidance. For example, preference can be given to links that do not pass near the same obstructions (e.g., wherein passing near means that the obstruction penetrates a Fresnel zone of the link, preferably the first Fresnel zone). This can enable the set of links to be more tolerant of obstruction movement, obstructions exhibiting obstructive properties that are worse than expected, unexpected obstructions (e.g., obstructions not represented in the obstructions dataset), and/or other potentially detrimental effects associated with the obstructions.

In considering factors such as network and/or obstruction redundancy, selecting the subset can optionally include selecting potential links other than the ones with the best link evaluations. For example, a set of links with good evaluations (e.g., greater than a threshold value within a threshold relative value of the best links, greater than a threshold percentile considered) that satisfy these redundancy criteria can provide high quality links that also achieve redundancy goals.

The subset selected for each candidate radio cluster location preferably has the same number of links (e.g., a predetermined number of links). However, for candidate radio cluster locations that have fewer potential radio links than the predetermined number, the entire set of potential radio links can be selected. The predetermined number can be, in examples, 2, 3, 4, 5, 8, 10, 20, 1-4, 4-10, 10-30, and/or any other suitable number of radio links.

S233 preferably includes determining the location evaluation based on the link evaluations and/or redundancy metrics associated with the selected subset of radio links. For example, the location evaluation can be equal to the average or median of the link evaluations, the worst of the link evaluations, the link evaluation of a particular percentile (e.g., 10th percentile, 25th percentile, etc.), and/or can be determined in any other suitable manner. For candidate locations with fewer links (e.g., in the subset) than typical (e.g., fewer than the predetermined number), the subset can be considered (e.g., for the purposes of determining the location evaluation) to include one or more additional links (e.g., equal to the number by which the subset has fewer links than typical), preferably associated with poor or zero-value link evaluations. For example, if the predetermined number of links in the subset is 5, and a particular candidate location only has 3 potential links, then it can be evaluated as if it included those 3 links plus two more links with a poor link evaluation.

However, S233 can additionally or alternatively include determining the location evaluation in any other suitable manner.

Selecting a planned location S234 preferably functions to determine where to install the radio cluster. S234 preferably includes determining which radio cluster location and/or radio links to use for installation. S234 can include determining a single radio cluster location, multiple radio cluster location options, a prioritized list of radio cluster locations, and/or any other suitable set of one or more locations (e.g., as described above, such as regarding determining the likelihood of success). S234 preferably includes selecting a candidate radio cluster location as the planned location (e.g., based on the respective location evaluations). The candidate radio cluster location with the best location evaluation is preferably selected. However, S234 can additionally or alternatively include selecting any other suitable location.

S234 can additionally or alternatively include selecting a subset of potential radio links from the set of potential radio links associated with the planned location (e.g., based on the link evaluations associated with the planned location, based on redundancy criteria etc. such as described regarding S233). This subset is preferably the subset of links selected in S233, but can alternatively be any other suitable subset.

In some embodiments, some of the links of this subset are designated as primary choices (e.g., planned to be established by one or more radios of the cluster), whereas others (e.g., the remainder) are designated as backup choices (e.g., planned for use if one or more primary choices is unavailable, less performant than expected, and/or otherwise less desirable than the backup choice). In one example, the backup choices are generic backups (e.g., wherein any backup can be used as a substitute for any primary choice). In a second example, each primary choice (or a subset thereof) is associated with a different set of one or more backup choices (e.g., enabling consideration of redundancy criteria).

In some embodiments, a link (or multiple links, such as a primary and one or more backups) is selected for each radio of the cluster (e.g., intended to be installed in the cluster). In other embodiments, one or more radios of the cluster do not have links associated with them, which can function to reserve the radio for future connection to a radio (e.g., of a later-installed node). However, the radios can alternatively be associated with radio links in any other suitable manner.

S234 can optionally include selecting one or more backup locations (e.g., from the set of candidate radio cluster locations) preferably selecting a subset of radio links for each backup location. For example, after selecting the planned location and the associated subset of links, S234 can be repeated, ignoring and/or excluding the planned location and any already-selected backup locations. These repetitions can optionally include accounting for redundancy between the planned location and backup locations. For example, a minimum distance between the planned location and the backup locations can be required, and/or backup locations can be selected preferentially based on their use of substantially different radio links (e.g., radio links to different installed radios) than the planned location.

S234 can optionally include updating one or more datasets (e.g., installed radios dataset) based on the selections. For example, radios of the planned location (and/or one or more backup locations) can be added to the installed radios dataset (e.g., as planned and/or potential radios).

However, S234 can additionally or alternatively include selecting the planned location in any other suitable manner.

3.4 Determining Information Associated with Radio Installation.

Determining information associated with radio installation S250 preferably functions to generate installation instructions for a radio cluster (e.g., generating radio installation parameters and/or radio configuration parameters). The information is preferably determined based on the planned location and/or the subset of possible radio links selected in S234, but can additionally or alternatively be determined based on any other suitable information. For example, S250 can include generating an installation work request for a selected one or more proposed radio connections.

In some embodiments, S250 functions to generate an installation ticket or installation work request. The installation work request may include specific installation parameters (e.g., automatically-generated parameters, such as generated based on the planned location, subset of potential radio links, and/or installed radios dataset) for each of the potential radio links of the subset (e.g., the planned and/or proposed radio connections). The installation parameters may specifically identify the candidate mountings points for the installation together with three-dimension coordinates for the installation, a number of radios to be installed at each candidate radio cluster location (i.e., the number of radios in the cluster), a location (e.g., along a pole to be installed at the candidate radio cluster locations) and/or orientation of each radio within the cluster, such as coordinates for each of the radios, physical headings for each of the radios, tilt for each radio, and/or any other suitable physical alignment and/or configuration details for suitably installing and/or setting a radio for a valid connection with one or more of the installed radios (e.g., the installed radio of the selected radio link). The radio configuration parameters may include, for example, specific radio configuration parameters (e.g., automatically-generated parameters), such as antennae configuration for a specific frequency, an SSID, an encryption for communications, a bandwidth of the radio connection, and the like.

Additionally or alternatively, the installation work request may function to trigger a reserved space onto a physical structure or an area surrounding a physical at which the one or more radios will be installed. S250 may function to generate a virtual representation of the installation site, which may include a physical structure onto which the radios will be mounted and the radio cluster locations. The reserved space may include an indicator or some indicia drawn onto the virtual representation that specifically identifies the installation site and also, indicates to a system implementing the method 200 that the identified reserved space cannot be used for any other installation request or the like (e.g., effectively restricting other uses of the reserved spaced).

Additionally, or alternatively, once an installation work request or ticket is generated, S250 may function to automatically route the installation work request to an installation scheduler that provides a schedule (e.g., date/time or date/time range for completing the installation work request). In some embodiments, the scheduler may function to prioritize the installation work requests which activates the most radio nodes that create further active nodes for a greater amount of connection request in the connection queue.

S250 can optionally include updating one or more datasets (e.g., installed radios dataset, network dataset, etc.), such as based on plans to install and/or configure one or more radios. For example, in response to generating an installation work request or ticket, one or more radios associated with the request can be added to the installed radios dataset (e.g., associated with the radio and/or radio cluster location, radio orientation, radio type, etc.), preferably as planned radios.

However, S250 can additionally or alternatively include determining any other suitable information associated with radio installation in any other suitable manner.

3.5 Installing and/or Configuring Radios.

The method can optionally include installing and/or configuring one or more radios S260. S260 is preferably performed based on the information determined in S250 (e.g., in response to performing S250), more preferably functioning to implement the information (e.g., installation instructions).

For example, S260 can include installing a radio cluster based on the installation instructions and/or other information determined in S250. In a first example, the radio cluster is installed at the planned location. In a second example, the radio cluster is installed at one of the backup locations (e.g., after determining that the planned location is undesirable, such as being expected to offer worse performance than the backup location). However, the radio cluster can additionally or alternatively be installed at any other suitable location. Each radio of the radio cluster is preferably installed according to the instructions. For example, the radios can be oriented (e.g., based on the instructions) to enable and/or optimize establishment of the selected radio links (e.g., oriented toward the previously-installed radio with which they are supposed to communicate). However, the radios can additionally or alternatively be installed in any other suitable manner.

S260 can additionally or alternatively include (e.g., for each radio of the radio cluster) establishing a radio link (e.g., selected from the subset of potential radio links) between the radio and a radio of the set of installed radios. For example, after installing the radio cluster (e.g., at the planned location, backup location, etc.), each radio of the cluster can initiate communication with the previously-installed radio with which it is supposed to communicate.

S260 can optionally include updating one or more datasets (e.g., installed radios dataset, network dataset, etc.) based on radio installation and/or configuration. For example, in response to installing a radio cluster, each radio of the cluster is preferably added to the installed radios dataset (e.g., associated with the radio and/or radio cluster location, radio orientation, radio type, etc.).

However, S260 can additionally or alternatively include installing and/or configuring the radios in any other suitable manner.

3.6 Repetition.

The method 200 can optionally include repeating one or more of the elements described above, preferably repeating each element but alternatively repeating a subset thereof. For example, after updating one or more datasets (e.g., in response to candidate radio cluster location selection, radio cluster installation, radio configuration, etc.), the elements of the method can be repeated (e.g., for the next item in a queue, in response to receipt of another connection request, etc.). However, the method 200 and/or any suitable elements thereof can additionally or alternatively be repeated in any other suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for configuring radio communication devices, comprising:
   receiving an obstructions dataset comprising locations of a set of obstructions;
   receiving an installed radios dataset comprising locations of a set of installed radios;
   determining an installation region;
   determining a set of candidate radio cluster locations within the installation region;
   for each candidate radio cluster location of the set:
      based on the candidate radio cluster location, the installed radios dataset, and the obstructions dataset, determining a set of potential radio links between the radio cluster location and one or more installed radios of the set of installed radios, wherein each potential radio link of the set of potential radio links is associated with a different installed radio than the other potential radio links of the set of potential radio links;
      for each potential radio link of the set, determining a respective link evaluation; and
      based on the link evaluations, determining a respective location evaluation for the candidate radio cluster location;
   based on the respective location evaluations, selecting a candidate radio cluster location of the set as the planned location;
   based on the link evaluations associated with the planned location, selecting a subset of potential radio links from the set of potential radio links associated with the planned location; and
   determining installation instructions based on the planned location and the subset of potential radio links.

2. The method of claim 1, wherein the obstructions dataset is determined based on a lidar survey.

3. The method of claim 1, wherein determining the installation region comprises:
   receiving a connection request associated with a street address; and
   determining the installation region based on the street address, wherein the street address is an address of the installation region.

4. The method of claim 1, wherein the candidate radio cluster locations of the set are distributed over a roof of a structure within the installation region.

5. The method of claim 4, wherein the candidate radio cluster locations of the set substantially define a regular array.

6. The method of claim 1, wherein selecting the planned location comprises selecting the candidate radio cluster location of the set associated with the greatest number of unobstructed potential radio links.

7. The method of claim 1, wherein:
the method further comprises receiving a network dataset comprising information associated with a network comprising the set of installed radios; and
the link evaluations are determined based on the network dataset.

8. The method of claim 7, wherein, for each potential radio link, the respective link evaluation is determined based on an upstream route capacity associated with the installed radio of the potential radio link.

9. The method of claim 7, wherein, for each potential radio link, the respective link evaluation is determined based on a predicted radio link demand associated with the installed radio of the potential radio link.

10. The method of claim 1, wherein the link evaluations are determined based on the obstructions dataset.

11. The method of claim 10, wherein, for each potential radio link, the respective link evaluation is determined based on an obstruction metric associated with a Fresnel zone of the potential radio link.

12. The method of claim 1, wherein, for each candidate radio cluster location of the set, the respective location evaluation is determined based further on a route redundancy metric associated with the respective set of potential radio links.

* * * * *